(12) United States Patent
Loaiza et al.

(10) Patent No.: US 7,617,254 B2
(45) Date of Patent: *Nov. 10, 2009

(54) METHOD AND MECHANISM FOR RELATIONAL ACCESS OF RECOVERY LOGS IN A DATABASE SYSTEM

(75) Inventors: Juan R. Loaiza, San Carlos, CA (US); Richard L. Frank, Groton, MA (US); Joydip Kundu, Nashua, NH (US); Michael J. Cusson, Chelmsford, MA (US); Dan O'Shaughnessy, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 441 days.

This patent is subject to a terminal disclaimer.

(21) Appl. No.: 10/635,708

(22) Filed: Aug. 5, 2003

(65) Prior Publication Data

US 2004/0030954 A1    Feb. 12, 2004

Related U.S. Application Data

(63) Continuation of application No. 09/477,023, filed on Jan. 3, 2000, now Pat. No. 6,618,822.

(51) Int. Cl.
*G06F 12/00* (2006.01)
(52) U.S. Cl. .............. 707/202; 707/3; 707/4; 707/204; 714/20
(58) Field of Classification Search ............. 707/100, 707/102, 1, 2, 3, 4, 5, 101, 202; 714/20
See application file for complete search history.

(56) References Cited

U.S. PATENT DOCUMENTS

| | | | |
|---|---|---|---|
| 4,498,145 A | 2/1985 | Baker | |
| 4,868,744 A | 9/1989 | Reinsch et al. | |
| 5,249,300 A | 9/1993 | Bachman et al. | |
| 5,280,612 A | 1/1994 | Lorie et al. | |
| 5,317,731 A | 5/1994 | Dias et al. | |
| 5,347,653 A | 9/1994 | Flynn et al. | |
| 5,363,473 A | 11/1994 | Stolfo et al. | |
| 5,414,834 A * | 5/1995 | Alexander et al. | 707/100 |

(Continued)

FOREIGN PATENT DOCUMENTS

FR    2746526 A1    9/1997

OTHER PUBLICATIONS

Triantafillou P., IEEE Transactions on Software Engineering, vol. 22, No. 11, Nov. 1996, pp. 812-826.*
Wiener et al., VIEWS, 1996, pp. 26-33 (provided reference has been numbered as pp. 1-8).*
Ramakrishnan R., Database Management Systems, WCB3/McGraw-Hill, 1998, pp. 529-533.*
Lindsay et al., ACM SIGMOD Record, 1986, pp. 53-60.*
James T. Perry and Joseph G Lateer, Understanding Oracle, 1989, Sybex, 1.sup.st ed., 4-7, 43, 95, and 161-164.
Lee, C. et al. "Temporal Grid File: a file structure for interval data" Data & Knowledge Engineering 26 (1998) pp. 71-97.

(Continued)

*Primary Examiner*—Cheyne D Ly
(74) *Attorney, Agent, or Firm*—Vista IP Law Group, LLP

(57) ABSTRACT

The present invention is directed to a method and mechanism for accessing recovery log information in a database system. The data stored in the recovery log is presented as a relational database "view," which can be queried and accessed using relational database statements even though the underlying recovery log data may be stored in a non-relational format. According to an aspect of the invention, the recovery log data is thus encapsulated by the view presented to users of that data.

31 Claims, 5 Drawing Sheets

U.S. PATENT DOCUMENTS

| | | | |
|---|---|---|---|
| 5,440,730 A | 8/1995 | Elmasri et al. | |
| 5,481,699 A | 1/1996 | Saether | |
| 5,524,205 A | 6/1996 | Lomet et al. | |
| 5,638,508 A | 6/1997 | Kanai et al. | |
| 5,701,480 A | 12/1997 | Raz | |
| 5,758,356 A | 5/1998 | Hara et al. | |
| 5,819,020 A | 10/1998 | Beeler, Jr. | |
| 5,835,698 A | 11/1998 | Harris et al. | |
| 5,845,292 A | 12/1998 | Bohannon et al. | |
| 5,850,507 A | 12/1998 | Ngai et al. | |
| 5,852,715 A * | 12/1998 | Raz et al. | 709/201 |
| 5,862,318 A | 1/1999 | Habben | |
| 5,864,849 A | 1/1999 | Bohannon et al. | |
| 5,870,758 A | 2/1999 | Bamford et al. | |
| 5,873,102 A | 2/1999 | Bridge, Jr. et al. | |
| 5,890,161 A | 3/1999 | Helland et al. | |
| 5,890,167 A | 3/1999 | Bridge, Jr. et al. | |
| 5,907,848 A | 5/1999 | Zaiken et al. | |
| 5,923,833 A | 7/1999 | Freund et al. | |
| 5,933,838 A * | 8/1999 | Lomet | 707/202 |
| 5,940,839 A | 8/1999 | Chen et al. | |
| 5,956,731 A | 9/1999 | Bamford et al. | |
| 5,963,959 A * | 10/1999 | Sun et al. | 707/200 |
| 5,966,706 A | 10/1999 | Biliris et al. | |
| 5,974,427 A | 10/1999 | Reiter | |
| 5,995,980 A | 11/1999 | Olson et al. | |
| 5,996,088 A | 11/1999 | Frank et al. | |
| 5,999,943 A | 12/1999 | Nori et al. | |
| 6,012,060 A | 1/2000 | Loaiza et al. | |
| 6,014,674 A | 1/2000 | McCargar | |
| 6,018,746 A | 1/2000 | Hill et al. | |
| 6,138,121 A | 10/2000 | Costa et al. | |
| 6,154,847 A | 11/2000 | Schofield et al. | |
| 6,173,292 B1 | 1/2001 | Barber et al. | |
| 6,182,241 B1 | 1/2001 | Ngai et al. | |
| 6,185,699 B1 | 2/2001 | Haderle et al. | |
| 6,192,370 B1 | 2/2001 | Primsch | |
| 6,192,377 B1 | 2/2001 | Ganesh et al. | |
| 6,237,001 B1 | 5/2001 | Bamford et al. | |
| 6,289,335 B1 * | 9/2001 | Downing et al. | 707/3 |
| 6,321,234 B1 | 11/2001 | Debrunner | |
| 6,341,288 B1 | 1/2002 | Yach et al. | |
| 6,363,499 B1 | 3/2002 | Delo et al. | |
| 6,405,217 B1 | 6/2002 | Lee | |
| 6,438,749 B1 | 8/2002 | Chamberlain | |
| 6,449,624 B1 | 9/2002 | Hammack et al. | |
| 6,457,021 B1 | 9/2002 | Berkowitz et al. | |
| 6,480,848 B1 | 11/2002 | DeKimpe et al. | |
| 6,513,093 B1 | 1/2003 | Chen et al. | |
| 6,529,921 B1 | 3/2003 | Berkowitz et al. | |
| 6,567,928 B1 | 5/2003 | Lyle et al. | |
| 6,618,822 B1 | 9/2003 | Loaiza et al. | |
| 6,631,374 B1 | 10/2003 | Klein et al. | |
| 6,640,244 B1 | 10/2003 | Bowman-Amuah | |
| 6,678,696 B1 | 1/2004 | Helland et al. | |
| 6,769,074 B2 | 7/2004 | Vaitzblit | |
| 6,801,915 B1 | 10/2004 | Mack | |
| 6,889,231 B1 | 5/2005 | Souder et al. | |
| 7,206,805 B1 | 4/2007 | McLaughlin | |
| 7,277,900 B1 | 10/2007 | Ganesh et al. | |
| 2002/0007363 A1 | 1/2002 | Vaitzblit | |
| 2004/0030954 A1 | 2/2004 | Loaiza et al. | |
| 2005/0125430 A1 | 6/2005 | Souder et al. | |
| 2005/0131966 A1 | 6/2005 | Lou | |
| 2005/0193035 A1 | 9/2005 | Byrne | |
| 2005/0240633 A1 | 10/2005 | Krishnaswamy et al. | |
| 2006/0212492 A1 | 9/2006 | Jacobs et al. | |

OTHER PUBLICATIONS

Amagasa, T. et al. "Implementing Time-Interval Class for Managing Temporal Data", International Workshop on Database and Expert Systems Applications (Aug. 26, 2003) pp. 84,88,843-849.

Oracle8™ Concepts, vol. 1, Release 8.0, Dec. 1997, Oracle®, pp. 18-14, 21-8, and 24-8 through 24-20.

Weikum, et al. "Multi-Level Recovery" ACM (1990) pp. 109-123.

Strom et al. "Optimistic Recovery in Distributed Systems" ACM Transactions on Computer System (Aug. 1995) vol. 3, No. 3, pp. 204-226.

Gomes et al. "Multiplexed State Saving for Bounded Rollback" Proceedings of the 1997 Winder Simulation Conference, Atlanta, GA pp. 460-467.

Microsoft Word User'S Guide, Microsoft Corporation, 1993, pp. 14, 15, 40.

* cited by examiner

METHOD AND MECHANISM FOR RELATIONAL ACCESS OF RECOVERY LOGS IN A DATABASE SYSTEM

CROSS-REFERENCE TO RELATED APPLICATIONS

This application is a continuation of Ser. No. 09/477,023, filed on Jan.3, 2000, now U.S. Pat. No. 6,618,822 B1, issued on Sep. 9, 2003, which is hereby incorporated by reference in its entirety for all purposes as if fully set forth herein.

BACKGROUND OF THE INVENTION

1. Field of the Invention

The invention relates to computer systems, and more particularly to the access of recovery logs in a database system.

2. Background

The occurrence of a hardware, software, network, process, or system failures in a database system could result in corruption, inconsistencies, or errors to database data. To prevent such problems from occurring, many database systems implement recovery mechanisms capable of restoring the database to a consistent and error-free state if such failures are detected. Recovery mechanisms typically utilize one or more recovery logs or recovery files (collectively referred to herein as "recovery logs") to perform the recovery process. Recovery logs record information about the database data, such as changes to the database data or the state of database data as of a certain point in time.

A commonly implemented recovery log is a "redo log." Redo logs contain records of changes made to objects in a database system, regardless of whether the changes are committed or uncommitted. For example, the redo log may record a stream of data containing the identity of each data item that changed in the database, as well as the precise change that is made to the data item. If a failure occurs, the redo log can be used during the recovery process to "redo" any changes that occurred prior to the failure, to place the database in a consistent state as of a specific point in time.

Another type of recovery log is the "undo log." Undo logs store information that can be used to undo or roll back a change that occurs in the database. For example, an undo log may record a stream of data containing the identity of each data item that is changed in the database, as well as the old value of the data item prior to the change. If a failure occurs, the undo log information is used to roll the database back to a consistent state as of a specific point in time (e.g., by removing all uncommitted data from the database).

Since recovery logs effectively become a historical repository for all changes made to the database data, the information recorded in the recovery logs can be used for many purposes beyond just system recovery operations. For example, the change log information can be used for auditing purposes. Consider if it is desired to audit financial transactions made against financial data stored in a database. Since every change to the financial data is stored in the recovery logs, detailed auditing of changes can be made to any data item at any point in time covered by the recovery logs information.

Statistical analysis of the recovery log information can also be used for capacity planning, system tuning, and system sizing purposes. Moreover, change information in the recovery logs can be used to reconstruct database statements (e.g., structured query language "SQL" statements) that implement changes to the database.

In addition, recovery log information allows any logical corruption in the database to be precisely pinpointed. This is helpful in performing time-based or change-based recovery, allowing the database to be restored to a consistent state before the exact moment that a failure occurs. Moreover, precise identification of logical corruption facilitates debugging of complex applications.

Information in recovery logs are normally stored in a proprietary and/or encoded format. To provide access to this data, the data format of the recovery logs is published by the developer of the database system. If it is desired to access the recovery log data, specialized utilities can be developed to retrieve information from the recovery logs. To properly access this information, the specialized utilities employ the published format information of the recovery logs to properly interpret any data retrieved from the logs.

One drawback to this approach is that if the format of the recovery logs is changed by the developer of the database system, then every utility based upon the previously published formats becomes obsolete or inoperative. Every time the recovery log format changes, significant expenses and resources must be expended to rework existing utilities to accommodate the new recovery log formats. This creates significant disincentives for a developer to change recovery log formats after they have been published. This becomes a difficult situation for many database developers. If the format of recovery logs are not published, then users do not have effective access to the information contained in recovery logs. However, if the recovery log formats are published, then constraints may be imposed upon the developer's ability to make changes to the recovery log formats.

Therefore, there is a need for an improved method and mechanism for managing access to information contained in database recovery logs. Thus, an object of the invention is to provide a method and mechanism for allowing users to access information stored in recovery logs, yet provide the user adequate insulation from potential changes in recovery log formats that may be imposed by database developers.

SUMMARY OF THE INVENTION

The present invention is directed to a method and mechanism for accessing recovery log information in a database system. The data stored in the recovery log is presented as a relational database "view," which can be queried and accessed using relational database statements even though the underlying recovery log data may be stored in a non-relational format. According to an aspect of the invention, the recovery log data is thus encapsulated by the view presented to users of that data.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Figure 1:
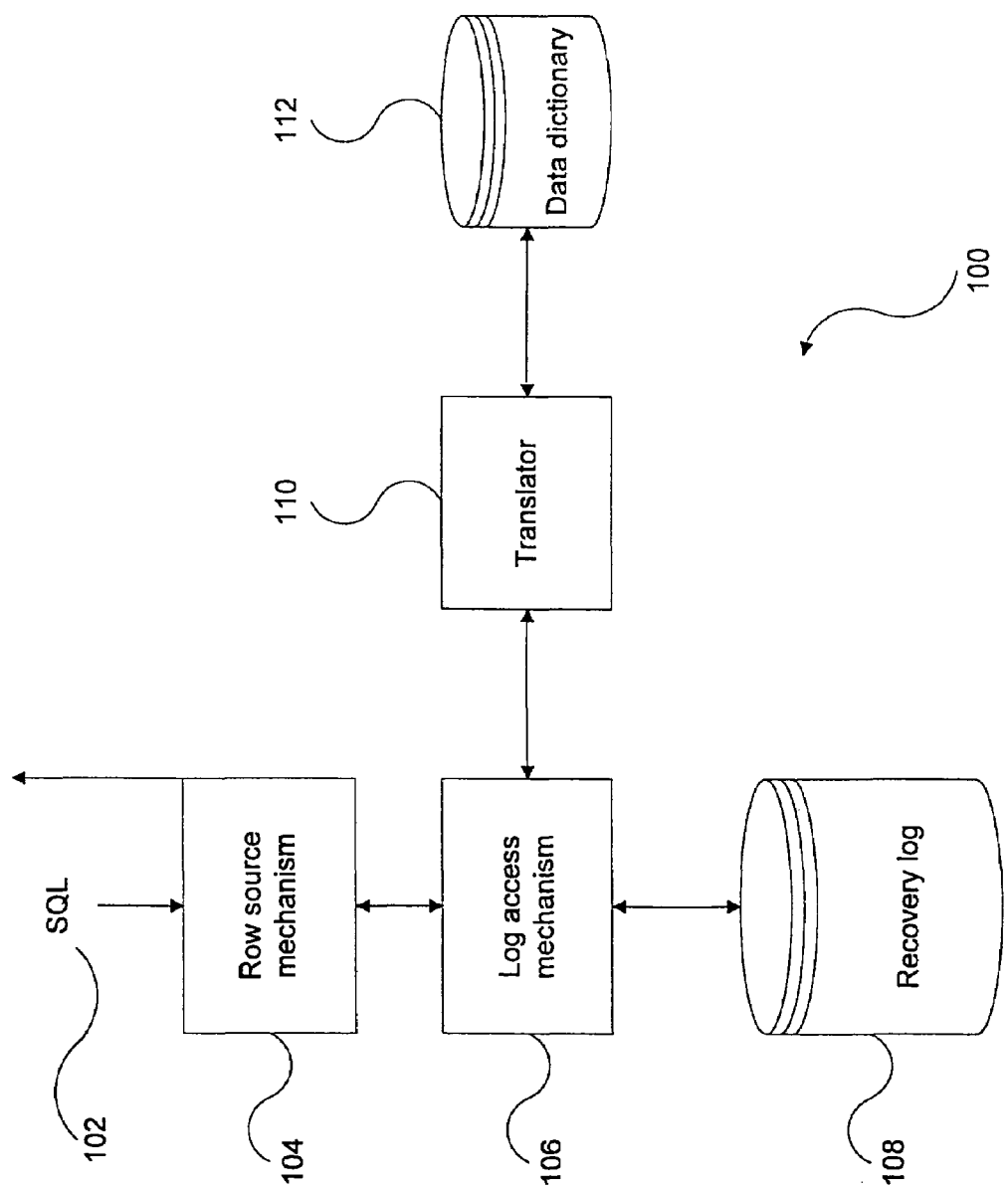
FIG. 1 depicts an architecture for accessing recovery logs according to an embodiment of the invention.

The present invention is directed to a method and mechanism for accessing recovery log information in a database system. According to an embodiment of the invention, the data stored in the recovery log is presented as a relational database "view," which can be queried and accessed using relational database query statements (e.g., structured query language, which is commonly referred to as "SQL") even though the underlying recovery log data may actually be in a non-relational format. Thus, the recovery log data is encapsulated by the view presented to users of that data. Regardless of the underlying format for the recovery log data, or any later changes to that format, a consistent view can be provided to the user. This insulates the user from any changes that may be implemented to recovery log formats.

The database view of a recovery log ("log view") essentially provides a virtual database table that is constructed using data retrieved from one or more recovery logs. From a user's point of view, accessing a log view is similar to accessing an ordinary database table. A SQL statement can be written to access or manipulate data in the virtual rows and columns of the log view. A set of columns is defined for the log view, in which each column corresponds to an item of data retrieved or formed from a recovery log record. The log view can be tailored to contain only columns of interest to the anticipated user. Thus, not all items of data from the recovery log necessarily needs to be included as a column in the log view. On the other hand, the log view may include columns that do not directly correspond to individual data items in the underlying recovery logs. This is useful, for example, if two or more data items from a recovery log are to be combined to form the contents of a log view column.

According to an embodiment of the invention, each log view is associated with a corresponding log access mechanism or function that is configured to work with the specific data format of the recovery logs. The log access mechanism receives raw data retrieved from the recovery logs, and provides the formatted data that comprises the virtual table of the log view. Thus, the log access mechanism is programmed to work with and understand the formats of the recovery logs. Under this approach, a user's SQL statement to access the log view never has to change if the format of the underlying recovery logs change. Instead, if the format of the recovery logs change, then the log access mechanism is reconfigured to be able to work with and understand the new formats.

As an illustrated example, consider a recovery log (e.g., an redo log) having a log record for each change to the database, in which each log record contains: (1) an object ID for the object being changed; (2) a timestamp for each record; (3) the changed data value; and (4) the block address of the recovery log file. As a change is performed to the database, a corresponding log record is generated in the recovery log. Each log record is streamed into the recovery log in a particular data format.

To provide relational access to the records in this recovery log, a log view is defined having virtual columns for each item of information sought for each log record. The following is an example of a log view that may be defined for the recovery log:

| Object ID | Timestamp | Block Addr. |
| --- | --- | --- |

Note that this example log view has only three columns even though each log record contains four categories of information. As stated above, not all items of data in a log record must necessarily be represented in the log view.

To access the information contained in the recovery log, a SQL statement is created to access a relational table having a table schema with the three columns shown. Since the user queries the log view rather than the underlying recovery logs, the user is thus fully insulated from having to know the particular format of the recovery logs. The log access mechanism performs the function of reformatting, for each record desired by the user, the raw recovery log data into the appropriate log view schema.

By interposing a log access mechanism between the user and the underlying recovery log data, the SQL statement developed by a user is fully protected from any later changes in the content or data format of the underlying recovery logs. For example, consider if the recovery log format set forth above is changed to include an additional category of information. The format of each log record may be revised to include a "Transaction ID," such that each log record contains the following categories of information: (1) an object ID for the object being changed; (2) a timestamp for each record; (3) the changed data value; (4) the block address of the recovery log file; and (5) transaction ID.

If the user does not seek to access the new category of information added to the log records, then the log view definition does not change. The log access mechanism can be configured to ignore the new category of information, but to format the recovery log data into the virtual columns of the existing log view definition. Thus, the user's SQL statement does not change even after the format of the underlying recovery logs are changed.

The log view definition can also be changed to allow access to the new category of information. The log view definition can be modified to include an additional virtual column for the new information, as follows:

| Object ID | Timestamp | Block Addr. | Trans. ID |
| --- | --- | --- | --- |

To access the new category of information, a user creates a SQL statement that references the "Trans. ID" column of the log view. Note that if a user does not wish to access the new category of information, then the user's existing SQL statement can still access the log view without any modifications. Since the existing column definitions have not been changed, but that only a new column has been added, any SQL statements that structured to access the old log view definition will still be usable.

Consider if the recovery log format is changed to remove an existing category of information. The format of each log record may be revised to remove, for example, the "timestamp" category, such that each log record contains only the following categories of information: (1) an object ID for the object being changed; (2) the changed data value; and (4) the block address of the recovery log file. Under this circumstance, the log view definition does not have to change. However, in an embodiment, the log access mechanism will populate each column that corresponds to the deleted information with a NULL symbol.

The log view definition could be implemented with unassigned columns to plan for access of recovery logs for which data or column definitions are unknown at present. The following is a revised log view definition which defines several unassigned columns:

| Object ID | Timestamp | Block Addr. | PH1 | PH2 | PH3 |
|---|---|---|---|---|---|

Columns PH1, PH2, and PH3 are placeholder columns that are unassigned, although accessible by a user. Placeholder columns are generic columns that can later be associated with additional categories of data e.g., via a separate mapping file. The placeholder columns can be used to select changes to known tables, column names, and values from recovery log streams.

FIG. 1 depicts an architecture 100 for accessing recovery log information according to an embodiment of the invention. For each log view available on the system, a corresponding log access mechanism 106 is registered with the database system. Whenever a SQL statement 102 is received which seeks to access a registered log view, the appropriate log access mechanism 106 is called to return the recovery log data. The log access mechanisms 106 reads raw data from the recovery log 108, and returns recovery log data in the proper log view format.

In an embodiment of the invention, the log access mechanism is registered with the database management system's "row-source" mechanism 104. The row-source mechanism 104 is a structure within the database system that can be used to retrieve each row of data from a data source in response to a SQL statement. The row source mechanism 104 handles heterogeneous access to the underlying database data. Thus, different types of objects can be accessed by using different types of access functions. Specific access functions are registered for the data object types in the database system. An example of such a row-source mechanism 104 can be found in the Oracle 8i database management system (available from Oracle Corporation of Redwood Shores, Calif.). In an embodiment of the invention, the row source mechanism 104 is responsible for receiving recovery log data that has been formatted into the proper log view format by the log access mechanism 106. The row source mechanism 104 then filters this data, and returns to the user rows of data corresponding to the rows sought by the SQL statement 102 (e.g., based upon the SQL statement's WHERE clause).

Alternatively, user-define functions are registered with the database system to create "virtual tables" that create a view of data in the recovery logs. The user-defined functions dynamically retrieve and populate column values for a virtual table from underlying data sources (i.e., recovery logs). An example of a method and mechanism for implementing these user-defined functions is described in co-pending U.S. Application Ser. No. 09/476,141, filed on even day herewith, which is hereby incorporated by reference in its entirety.

In many database systems, the contents of recovery logs are encoded. For example, recovery log records may use Object IDs to reference objects instead of object names. As another example, recovery log records may use hexadecimal (base 16) or binary (base 2) representations of data values, instead of external data formats. According to an embodiment of the invention, the log access mechanism 106 utilizes a translator 110 to translate such internal data representations into external data formats. Translator 110 references metadata, such as metadata stored in a data dictionary 112, to implement the translation. Metadata is used in a database system to describe other items of data. For example, metadata regarding a database object provides correlation between an Object ID and its object name. Because metadata in a database changes over time, the translator needs to access metadata that corresponds to the correct time frame for the recovery log 108 being accessed.

Figure 2:
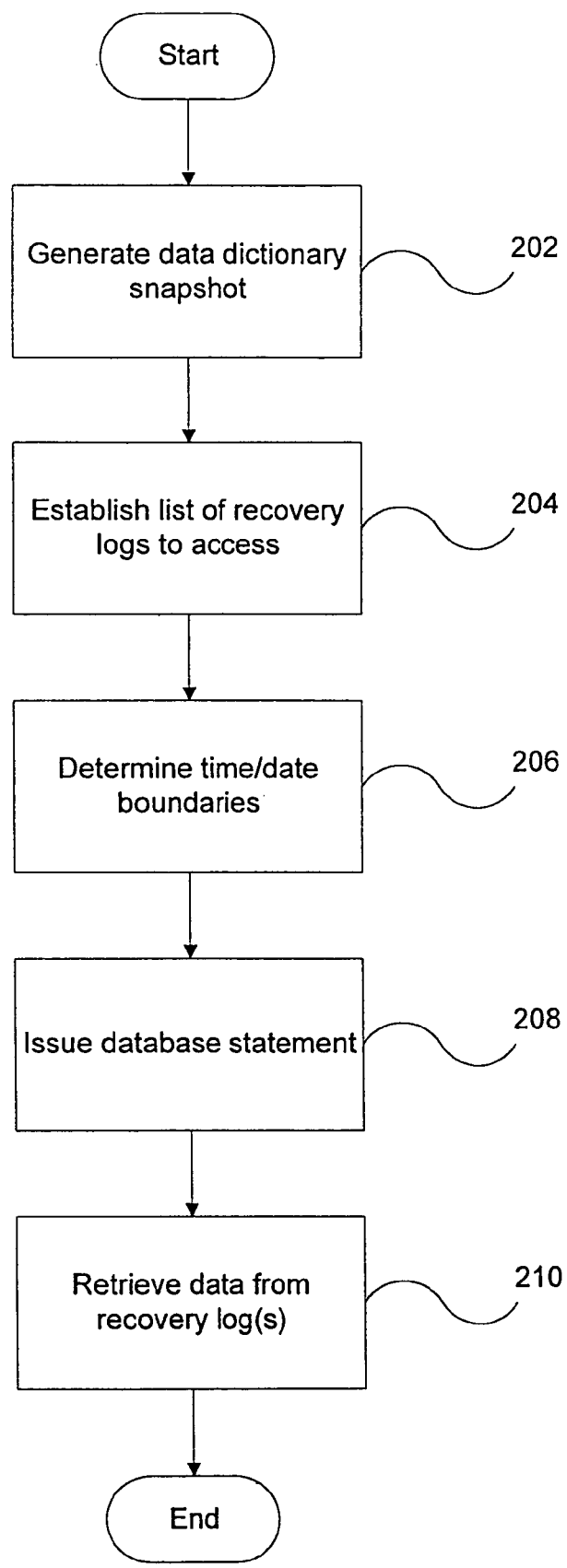
FIG. 2 depicts a process flow for accessing recovery logs according to an embodiment of the invention.

FIG. 2 depicts a process flow of an embodiment of the invention for accessing encoded recovery log information. If the recovery log data is encoded with internal data representations, then metadata is recorded for the recovery log to be accessed. This is performed by generating a dictionary file, which is a snapshot of the database system's data dictionary as of a particular point in time (202). Note that the dictionary file is generated to correspond to a specific time frame of recovery log records to be examined at a later date. Thus, a series of data dictionary snapshots could be taken at intervals over a period of time to ensure that an appropriate set of metadata always exists for any particular time frame of recovery log records. However, even if metadata has not been recorded for a relevant time frame, the contents of the data dictionary for that time frame can be derived based upon redo and undo log entries that have been recorded for the data dictionary.

When it is desired to access the recovery logs, a list of the recovery logs to be accessed is generated (204). The time range of the log access can be specified (206) to limit the volume of recovery log records to be accessed. If a time range is not specified, then the entire contents of the named recovery logs are accessed. The invention can be configured to automatically generates a list of recovery logs to be accessed if a time range is specified, thus not requiring process action 204.

At this point, the virtual log view table is available to be queried. A SQL statement can be issued to query the contents of the appropriate log view table (208). The requested information is thereafter retrieved from the recovery logs and returned in the proper format (210).

Figure 3:
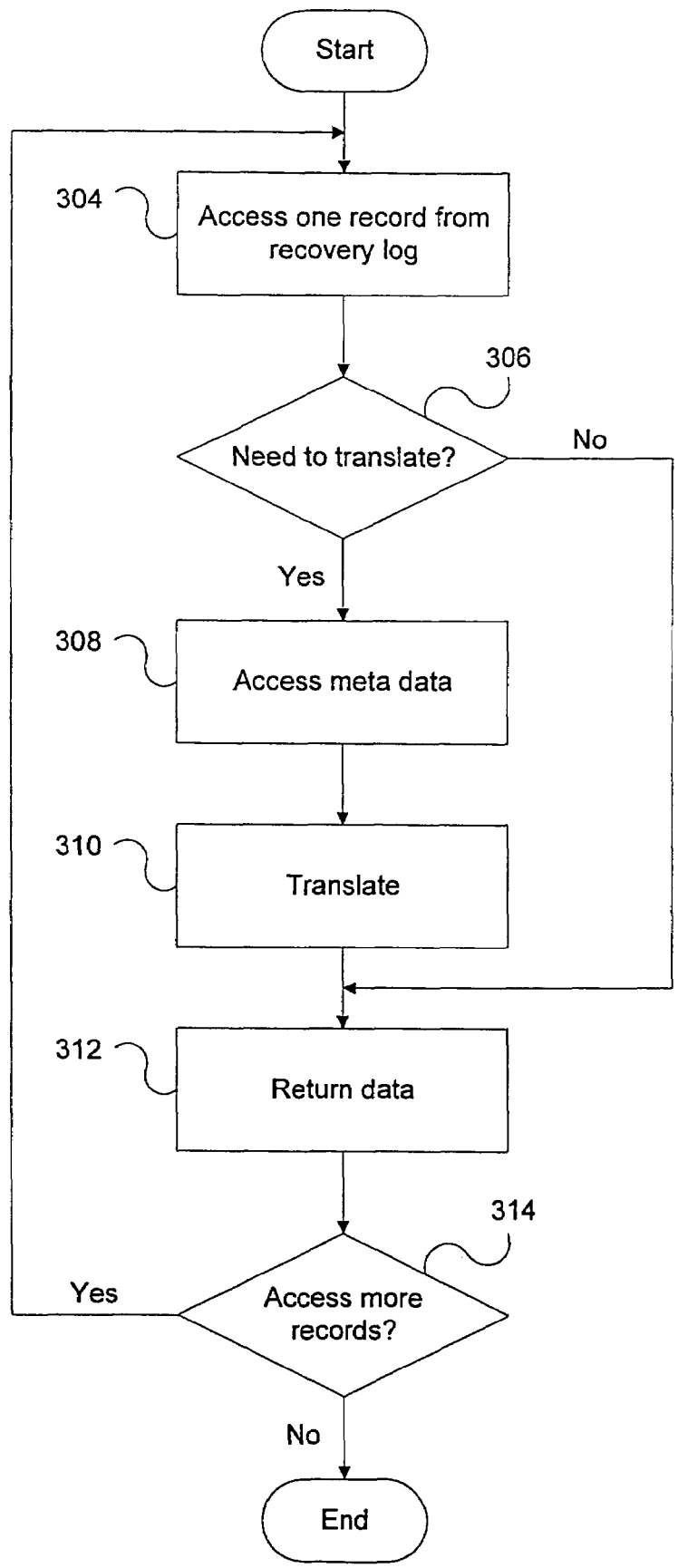
FIG. 3 depicts a process flow of a log access mechanism according to an embodiment of the invention.

FIG. 3 depicts the process flow for actions performed by an embodiment of the log access mechanism of the present invention. The log access mechanism reads a first record from a recovery log (304). Based upon the internal representations of the recovery log record, a determination is made whether a translation is needed (306). If translation is needed, then the appropriate metadata is accessed (308), and retrieved data items are translated into external data formats (310). The log access mechanism then returns the retrieved data in the proper log view format (312). A determination is then made as to whether more recovery log records are to be accessed (314). If so, then the process loops through process actions 304-314 until no more recovery log records are to be accessed.

One advantage of the invention is that the "virtual" log view established over the recovery logs is not an actual database table; therefore, database storage is not absolutely required for the log view. In addition, since the log view is accessible similar to any ordinary relational database table, the entire spectrum of relational database query language statements (e.g., declarative joins, opening a cursor, etc.) can be applied against that log view. Thus, complex SQL queries can be effectively issued against the recorded log stream. Moreover, since the log files encompass information for multiple database tables, a single log view can provide accessible data for multiple tables over a broad range of time frames.

The following describes column definitions for a recovery log view according to an embodiment of the invention used to access recovery logs in an Oracle 8i database:

| COLUMN | DATA TYPE | DESCRIPTION |
| --- | --- | --- |
| SCN | NUMBER(15) | System Change Number(SCN) that identifies when a redo record is generated. SCN is a monotonically increasing number used to delineate time periods of change in the database system. |
| TIMESTAMP | DATE | Date when redo record was generated. |
| THREAD# | NUMBER | Identifies thread which generated the redo record. |
| LOG_ID | NUMBER | Identifies log file which contains the redo record. |
| XIDUSN | NUMBER | Transaction Id Undo Segment Number. A Transaction Identifier is constructed from the XIDUSN, XIDSLOT, and XIDSQN and is used to identify the transaction which generated the change |
| XIDSLOT | NUMBER | Transaction Id Slot Number. Identifies the transaction table entry number. |
| XIDSQN | NUMBER | Transaction Id Sequence Number. |
| RBASQN | NUMBER | Uniquely identifies the log that contained the redo record among a group of redo logs. An RBA (redo block address) is composed of the RBASQN, RBABLK, and RBABYTE fields |
| RBABLK | NUMBER | The block number within the log file |
| RBABYTE | NUMBER | The byte offset within the block |
| UBAFIL | NUMBER | UBA (undo block address) File Number identifying the file containing the Undo Block. The UBA is constructed from the UBAFIL, UBABLK, UBASQN, and UBAREC and used to identify the undo generated for the change |
| UBABLK | NUMBER | UBA Block Number |
| UBAREC | NUMBER | UBA Record Index |
| UBASQN | NUMBER | UBA Undo Block Sequence Number. |
| ABS_FILE# | NUMBER | Data Block Absolute File Number. The ABS_FILE#, together with the REL_FILE#, DATA_BLOCK#, DATA_OBJ#, DATA_DOBJ, identify the block changed by the transaction |
| REL_FILE# | NUMBER | Data Block Relative File Number. The file number is relative to the tablespace of the object |
| DATA_BLOCK# | NUMBER | Data Block Number |
| DATA_OBJ# | NUMBER | Data Block Object number |
| DATA_DOBJ# | NUMBER | Data Block Data object number identifying the object within the tablespace |
| SEG_OWNER | VARCHAR2 (30) | Name of the user owning the object |
| SEG_NAME | VARCHAR2(81) | Name of the structure the segment was allocated for (e.g. table name, cluster name etc.). Partitioned tables will have a segment name constructed of two parts, the table name followed by a comma separated partition name (e.g., TableName, PartitionName). |
| SEG_TYPE | NUMBER | The type of the segment - numeric form. |
| SEG_TYPE_NAME | VARCHAR2 (17) | The type of segment - string form (e.g. TABLE, INDEX, etc.) |
| TABLE_SPACE_NAME | VARCHAR2 (30) | Name of the tablespace |
| ROW_ID | VARCHAR2(18) | Row Id |
| SESSION# | NUMBER | Identifies session which generated the redo. A NULL value will be reported if the session number is not available from the redo log |
| SERIAL # | NUMBER | Serial number of the session which generated the redo. The Session# and Serial # can be used to uniquely identify the database session. A NULL value will be reported if the session number is not available from the redo log. |
| USER_NAME | VARCHAR2 (30) | Name of the user initiating the operation that generated the redo record. |

-continued

| COLUMN | DATA TYPE | DESCRIPTION |
|---|---|---|
| SESSION_INFO | VARCHAR2(4000) | String containing: Login User Name, Client Info, OS User Name, Machine Name, OS Terminal, OS PID, OS Program Name. |
| ROLLBACK | NUMBER | A value of TRUE identifies operations and SQL statements that were generated as a result of a Rollback request. Otherwise, value is FALSE. |
| OPERATION | VARCHAR2 (30) | Type of SQL Operation, e.g., INSERT, DELETE, UPDATE, COMMIT, and BEGIN_TRANSACTION. |
| SQL_REDO | VARCHAR2 (4000) | The SQL_REDO and SQL_UNDO columns contain SQL compliant statements that represent the logical REDO and UNDO operations decoded from one or more archive log records. A NULL value indicates that no valid SQL statement can be generated for the Redo record. Some Redo records may not be translatable. In this case, the SQL_REDO and SQL_UNDO will be NULL and the STATUS column will contain the string 'UNSUPPORTED' |
| SQL_UNDO | VARCHAR2 (4000) | SQL Undo. See above description of SQL_REDO. |
| RS_ID | VARCHAR2(30) | Record Set Id. RS_ID uniquely identifies the set of records used to generate a SQL statement (a set may be a single record). It can be used to determine when multiple records generate a single SQL statement (i.e., chained rows). The RS_ID will be identical for all records within the set. The SQL statement will appear only in the last row the record set. The SQL_REDO and SQL_UNDO columns for all other rows, within the set, will be NULL.<br>NOTE: The RS_ID/SSN pair together provide a unique SQL Identifier for every SQL statement generated (see SSN below). |
| SSN | NUMBER | SQL Sequence Number. The SSN can be used to identify multiple rows, with valid SQL_REDO statements, that are generated from a single Redo record. All such rows will have the same RS_ID but a unique SSN. The SSN is an incrementing value starting at 1 for each new RS_ID. The RS_ID/SSN pair together provide a unique SQL Identifier for every SQL statement generated by LogViewR(see RS_ID above) |
| CSF | NUMBER | Continuation SQL Flag. CSF set to True indicates that a generated REDO_SQL or UNDO_SQL statement is larger than the maximum allowed size (4000 characters in an embodiment). SQL statements exceeding the maximum limit will span multiple rows.<br>When row spillage occurs the next row entry will contain the remainder of the SQL statement. The RS_ID, SSN pair will be identical for all continued rows corresponding to the same SQL statement. The last of the continued rows will have CSF set to FALSE to indicate the end of the SQL continuation. |
| STATUS | VARCHAR2(16) | Indicates status of the translation. Some example values are: (a) NULL value indicates a successful translation; (b) READ_FAILURE indicates an internal operating system failure to read from the log file; (c) TRANSLATION_ERROR indicates that translation cannot be completed (this may be due to a corrupted log or an out of date dictionary file). |

-continued

| COLUMN | DATA TYPE | DESCRIPTION |
|---|---|---|
| PH1_NAME | VARCHAR2(32) | Place Holder Column Name. Place Holder Columns are generic columns that can be assigned to specified database table columns, e.g., via an optional mapping file. These place holder columns are used to select changes to known tables, column names, and values from the redo stream. For example, "select xidusn, xidsqn, xidslot from log_view where seg_name = 'cust' and ph1_name = 'custid' and ph1_redo = 12345;" returns transaction that modified the 'custid' column of the 'cust' table to the value 12345. |
| PH1_REDO | VARCHAR2(4000) | Place Holder Column Redo Value. |
| PH1_UNDO | VARCHAR2(4000) | Place Holder Column Undo Value. |
| PH2_NAME | VARCHAR2(32) | Place Holder Column Name. |
| PH2_REDO | VARCHAR2(4000) | Place Holder Column Redo Value. |
| PH2_UNDO | VARCHAR2(4000) | Place Holder Column Undo Value. |
| PH3_NAME | VARCHAR2(32) | Place Holder Column Name. |
| PH3_REDO | VARCHAR2(4000) | Place Holder Column Redo Value. |
| PH3_UNDO | VARCHAR2(4000) | Place Holder Column Undo Value. |
| PH4_NAME | VARCHAR2(32) | Place Holder Column Name. |
| PH4_REDO | VARCHAR2(4000) | Place Holder Column Redo Value. |
| PH4_UNDO | VARCHAR2(4000) | Place Holder Column Undo Value. |
| PH5_NAME | VARCHAR2(32) | Place Holder Column Name. |
| PH5_REDO | VARCHAR2(4000) | Place Holder Column Redo Value. |
| PH5_UNDO | VARCHAR2(4000) | Place Holder Column Undo Value. |

Application Debugging Example

Database applications are often complex, and execution problems may arise if application developers or implementers are not be fully aware of all interdependencies between tables, particularly interdependencies caused by triggers or stored procedures. The present invention provides a vehicle for exploring complex interdependencies between different objects in the database, which facilitates the debugging of complex database applications.

For purposes of this example, consider a database system used by a university for tracking alumni donations. The database table containing alumni donation information is the DONOR table. It is discovered that certain donor names are being erroneously deleted from the DONOR database. It is suspected that one of the database applications on the system is creating the error, but it is not known which application. The present example illustrates how access to recovery log information can be used to determine the root cause of the error.

One approach to debugging this problem is to search the recovery logs for the operations that may have been erroneously performed. Thus, the recovery logs in this example are searched for DELETE operations that have been performed on the DONOR table. A date range and/or log file range can be used to narrow the initial scope of the search. The log view is filtered to find all DELETE within the specified date and log file ranges. If necessary, the appropriate data dictionary file is specified to produce results in the correct data format. Assume that the log view schema is as set forth in the above table. Using the above column definitions for the Oracle 8i database, the following SQL statement can be used to perform this initial search:

```
SELECT XidUsn, XidSlot, XidSqn, sql_redo
FROM log_view
WHERE seg_name like 'DONOR %' and operation = 'DELETE';
```

In this example, "log-view" refers to the view of the recovery logs that has been established for the desired logs/time periods. An example of possible resulting output is as follows:

| XIDUSN | XIDSLOT | XIDSQN | SQL_REDO |
|---|---|---|---|
| 1 | 7 | 1781 | delete from UNIV.DONOR where DONORID = 105 AND NAME = 'Donor6' AND CURR_AMOUNT = 10700 AND ALUM_REP_ID = 50 AND ALUM_REP_NAME = 'REP1' AND ROWID = 'AAABOKAABAAAEOzAAF'; |

This result indicates that the transaction referenced by this recovery log record has deleted a donor from the DONOR table. Thus, the next step is to search for all changes made by that same transaction. The following SQL statement can be used to implement this query:

```
Select XidUsn, XidSlot, XidSqn, sql_redo
FROM log_view
WHERE XidUsn = 1 and XidSlot = 7 and XidSqn = 1781;
```

The following is an example of possible results returned to this query:

| XIDUSN | XIDSLOT | XIDSQN | SQL_REDO |
|---|---|---|---|
| 1 | 7 | 1781 | set transaction read write |
| 1 | 7 | 1781 | update UNIV.DONOR set CURR_AMOUNT = 10700, LAST_AMOUNT = 7000 where ROWID = 'AAABOKAABAAAEOzAAF'; |
| 1 | 7 | 1781 | insert into UNIV.EXECDONOR(DONORID,NAME,CURR_AMOUNT, LAST_AMOUNT,ALUM_REP_ID,ALUM_REP_NAME) values (105,'Donor6',10700,7000,0,'CHANGEITNOW'); |
| 1 | 7 | 1781 | update UNIV.EXECDONOR set ALUM_REP_ID = 500, ALUM_REP_NAME = 'Rep10' where ROWID = 'AAABOLAABAAAEO4AAA'; |
| 1 | 7 | 1781 | delete from UNIV.DONOR where DONORID = 105 AND NAME = 'Donor6' AND CURR_AMOUNT = 10700 AND ALUM_REP_ID = 50 AND ALUM_REP_NAME = 'REP1' AND ROWID = 'AAABOKAABAAAEOzAAF'; |
| 1 | 7 | 1781 | commit; |

This output shows that the donor was deleted after insertion into the EXECDONOR table. Therefore, it follows that either the update to DONOR or the insertion to the EXECDONOR table caused the deletion. This may either occur due to faulty application logic or via a trigger or stored procedure. To find all triggers owned by UNIV the TRIGGERS table can be searched, as follows:

```
Select trigger_name, trigger_event, trigger_body
FROM TRIGGERS
WHERE trigger_owner = 'UNIV';
```

In this example, this query produces the following result:

| TRIGGER_NAME | TABLE_NAME | TRIGGER_EVENT | TRIGGER_BODY |
|---|---|---|---|
| DONOR_TRIG | DONOR | UPDATE | begin<br>if updating then<br>if(:new.Curr_Amount > 10000)<br>then<br>insert into |
| EXECDONOR_TRIG | EXECDONOR | UPDATE | begin<br>if updating then<br>if (:old.Alum_Rep_Name = 'CHANGEITNOW') then<br>delete from Univ |

To obtain the text of the query from the recovery logs, the following SQL statement can be issued:

```
SELECT sql_redo
FROM log_view
WHERE seg_name like 'TRIGGER$' and operation = 'INSERT'
```

The following result is produced:

SQL_REDO insert into
SYS.TRIGGER$(OBJ#,TYPE#,UPDATE$,INSERT$,DELETE$,
BASEOBJECT,REFOLDNAME,REFNEWNAME,DEFINITION, -continued

SQL_REDO

WHENCLAUSE,REFPRTNAME,ACTIONSIZE,ENABLED,
PROPERTY,SYS_EVTS,NTTRIGCOL,NTTRIGATT,ACTION
) values (5004,0,0,0,0,0, NULL, NULL, NULL, NULL,
NULL,213, NULL,0,0,0,0,
'begin
 if updating then
  if (:new.Curr_Amount > 10000) then
    insert into Univ.ExecDonor values (:new.DonorId, :new.Name,
    :new.Curr_Amount,
    :new.Last_Amount, 0, 'CHANGEITNOW');
  end if;

-continued

SQL_REDO end if;
end;
');
insert into
SYS.TRIGGER$(OBJ#,TYPE#,UPDATE$,INSERT$,DELETE$,
BASEOBJECT,REFOLDNAME,REFNEWNAME,DEFINITION,
WHENCLAUSE,REFPRTNAME,ACTIONSIZE,ENABLED,
PROPERTY,SYS_EVTS,NTTRIGCOL,NTTRIGATT,ACTION
) values (5005,0,0,0,0,0, NULL, NULL, NULL,
NULL,161, NULL,0,0,0,0,
'begin
 if updating then
  if (:old.Alum_Rep_Name = 'CHANGEITNOW') then
    delete from Univ.Donor where DonorId = :new.DonorId;
  end if;

-continued

```
SQL_REDO end if;
end;
');
```

Reading the trigger body code, it can be determined that any time a donor gives more than $10,000 he/she is moved to the EXECDONOR table with a dummy Alumni representative. Once the alumni representative is assigned (in this case, as part of the same transaction), the old row in DONOR table is deleted. Thus, a few simple queries in the recovery logs has determined that the deletion of a particular row in the DONOR table is associated with an update on the EXECDONOR. That critical piece of information leads directly to the discovery that an update trigger on the EXECDONOR table is responsible for the application error.

Audit Example

The information contained in recovery logs is particularly useful for auditing purposes. Consider a banking database in which it is discovered that a customer's checking account balance is at approximately $20 whereas it should be at approximately $10,000

Using the present invention, the information in the recovery logs can utilized to perform an audit trail analysis of the customer's bank account transactions. In this example, an initial query can be performed to find transaction involving this customer. A date range and/or log file range can be used to narrow the initial scope of the search. The log view is filtered to find all transaction involving the customer within the specified date and log file ranges. If necessary, the appropriate data dictionary file is specified to produce results in the correct data format. Assume that the log view schema is as set forth in the above table. Using the above column definitions for the Oracle 8i database, the following SQL statement can be used to perform this initial search:

```
SELECT timestamp, scn, operation, xidusn, xidsqn, XidSlot, sql_redo
FROM log_view
WHERE row_id = 'AAABOOAABAAAEPCAAA';
```

In this example, the row_id 'AAABOOAABAAAEPCAAA' corresponds to the customer that is experiencing the error in his bank account balance. The following is an example of the result of this SQL statement:

| TIMESTAMP | OPERATION | XIDUSN | XIDSLOT | XIDSQN | SQL_REDO |
|---|---|---|---|---|---|
| 03-AUG-1998: 08:15:23 | UPDATE | 1 | 11 | 1772 | Update CUST.BANK_ACCOUNT set AMOUNT = 14900 where ROWID = 'AAABOOAABAAAEPCAAA'; |
| 07-AUG-1998: 10:20:30 | UPDATE | 1 | 14 | 1778 | Update CUST.BANK_ACCOUNT set AMOUNT = 14700 where ROWID = 'AAABOOAABAAAEPCAAA'; |
| 09-AUG-1998: 11:21:31 | UPDATE | 1 | 14 | 1785 | Update CUST.BANK_ACCOUNT set AMOUNT = 9700 where ROWID = 'AAABOOAABAAAEPCAAA'; |

These results show that there were three different transactions to the customer's account. The SQL_UNDO field of the log_view table can be reviewed for the selected rows to find out the amount deducted from the customer's account for the first transaction (it can be seen that the second transaction deducted $200 and the third $14700-9700=$5000). If the account is supposed to contain $20000, then the amount deducted in the first transaction is approximately $20000-$14900~$5100). The following database statement can be issued to retrieve the desired sql_undo and sql_redo fields of the log_view table:

```
SELECT sql_redo, sql_undo
FROM log_view
WHERE row_id = 'AAABOOAABAAAEPCAAA';
```

This produces the following results:

| SQL_REDO | SQL_UNDO |
|---|---|
| update CUST.BANK_ACCOUNT set AMOUNT = 14900 where ROWID = 'AAABOOAABAAAEPCAAA'; | update CUST.BANK_ACCOUNT set AMOUNT = 20200 where ROWID = 'AAABOOAABAAAEPCAAA'; |
| update CUST.BANK_ACCOUNT set AMOUNT = 14700 where ROWID = 'AAABOOAABAAAEPCAAA'; | update CUST.BANK_ACCOUNT set AMOUNT = 14900 where ROWID = 'AAABOOAABAAAEPCAAA'; |
| update CUST.BANK_ACCOUNT | update CUST.BANK_ACCOUNT |

-continued

| SQL_REDO | SQL_UNDO |
|---|---|
| set AMOUNT = 9700 where ROWID = 'AAABOOAABAAAEPCAAA'; | set AMOUNT = 14700 where ROWID = 'AAABOOAABAAAEPCAAA'; |

Each individual transaction can be examined to determined the cause of the problem:

```
SELECT scn, sql_redo, sql_undo
FROM log_view
WHERE XidUsn = 1 and XidSlot = 11 and XidSqn = 1772;
```

This statement produces the following:

| SCN | SQL_REDO | SQL_UNDO |
|---|---|---|
| 462758 | set transaction read write; | |
| 462758 | update CUST.BANK_ACCOUNT set AMOUNT = 14900 where ROWID = 'AAABOOAABAAAEPCAAA'; | update CUST.BANK_ACCOUNT set AMOUNT = 20200 where ROWID = 'AAABOOAABAAAEPCAAA'; |
| 462758 | update CUST.BANK_ACCOUNT set AMOUNT = 10500 where ROWID = 'AAABOOAABAAAEPCAAC'; | update CUST.BANK_ACCOUNT set AMOUNT = 5200 where ROWID = 'AAABOOAABAAAEPCAAC'; |
| 462758 | update CUST.BANK_ACCOUNT set AMOUNT = 5100 where ROWID = 'AAABOOAABAAAEPCAAB'; | update CUST.BANK_ACCOUNT set AMOUNT = 10100 where ROWID = 'AAABOOAABAAAEPCAAB'; |
| 462758 | update CUST.BANK_ACCOUNT set AMOUNT = 15500 where ROWID = 'AAABOOAABAAAEPCAAC'; | update CUST.BANK_ACCOUNT set AMOUNT = 10500 where ROWID = 'AAABOOAABAAAEPCAAC'; |
| 462759 | commit; | |

It can thus be determined that the account with rowid 'AAABOOAABAAAEPCAAC' received the money that was deducted from the accounts of this customer and another customer with rowid 'AAABOOAABAAAEPCAAB'. This example shows the immense power of the invention in performing auditing functions. Using the invention, a large amount of critical information can be accessed even without enabling the standard auditing feature of the database or of specialized application logic. There is no additional performance or storage penalty (as is the case of auditing) since the information is culled from recovery logs that are already being maintained to support recovery operation in the database system.

Recovery Assistance Example

The invention can assist in both time-based and change-based recovery by pinpointing the time or the System Commit Number (SCN) when an offending transaction executed. Time-based recovery allows the database to be restored to a particular instant of time. Change-based recovery allows the database to be restored to a particular SCN.

In addition, the invention can be utilized to perform fined grained logical recovery. For example, it is possible to undo or redo a single change to the database. The invention can be utilized to undo a sequence of changes to a table, thus providing an undo based recovery mechanism.

Recall from the prior example that transaction 1.11.1772 incorrectly transferred funds between accounts in a banking database. The sql_undo column of the log_view table can be accessed to perform an undo of specific changes in the database. The following SQL, selected from the SQL_UNDO column of the log_view table, rolls back the transaction 1.11.1772 to restore the correct balance in customer accounts:

```
SQL_UNDO
Update CUST.BANK_ACCOUNT set AMOUNT = 10500
where
ROWID = 'AAABOOAABAAAEPCAAC';
update CUST.BANK_ACCOUNT set AMOUNT = 10100
where
ROWID = 'AAABOOAABAAAEPCAAB';
```

-continued

```
update CUST.BANK_ACCOUNT set AMOUNT = 5200 where
ROWID = 'AAABOOAABAAAEPCAAC';
update CUST.BANK_ACCOUNT set AMOUNT = 20200
where
ROWID = 'AAABOOAABAAAEPCAAA';
```

Note that in this example, a single undo was performed against a specified data item, without requiring an entire transaction or a sequence of undo records to be applied.

System Tuning Example

Information in recovery logs can be used to generate a wealth of information for tuning a database. In conventional database systems, tuning and capacity planning procedures normally require that statistics be maintained for system activity of interest. The recorded statistics are later analyzed to determine if the system configuration is adequately set for desired performance characteristics. The drawback to this approach is that additional overhead and costs must be expended to generate and maintain these statistics. In the present invention, recovery logs can be mined to generate information that can be used to tune the system configuration.

As an example, to see how the a table has been modified over a period of time (e.g., in a direct marketing database that records how productive customer contacts have been in generating revenues) the following query can be issued against the log_view table, with appropriate time frame and log set parameters set:

```
SELECT seg_owner, seg_name, count(*) as Hits
FROM log_view
WHERE seg_name not like '%$'
GROUP BY seg_owner, seg_name;
```

The following is an example of results produced by this query:

| SEG_OWNER | SEG_NAME | Hits |
|---|---|---|
| CUST | ACCOUNT | 384 |
| SCOTT | EMP | 12 |
| SYS | DONOR | 12 |
| UNIV | DONOR | 234 |
| UNIV | EXECDONOR | 325 |
| UNIV | MEGADONOR | 32 |

These results provide statistics that can be used to tune the system, even if the DBA did not have the forethought to gather such statistics periodically.

System Architecture Overview

Figure 4:
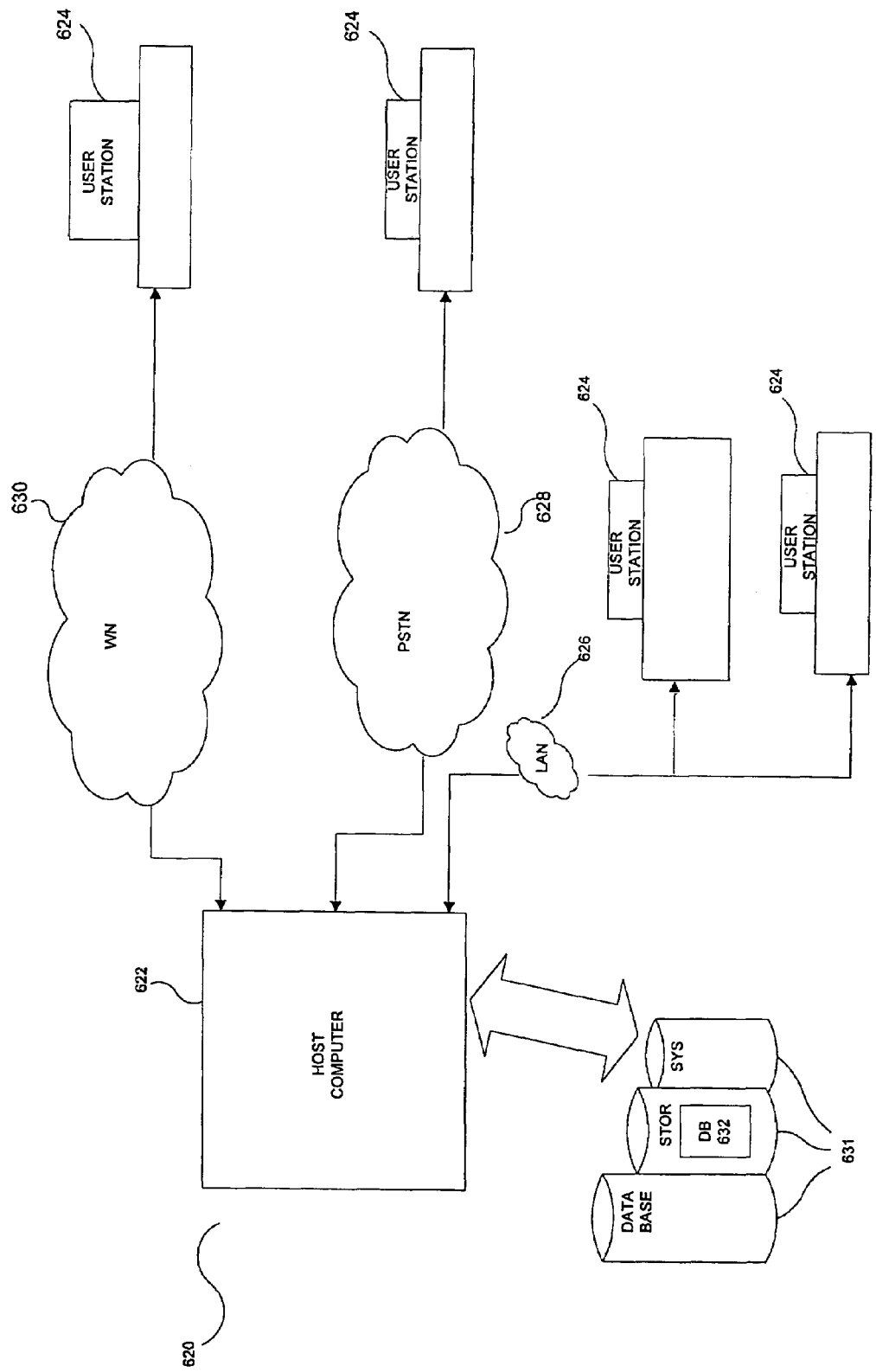
FIG. 4 is a diagram of a computer hardware system with which the present invention can be implemented.

Referring to FIG. 4, in an embodiment, a computer system 620 includes a host computer 622 connected to a plurality of individual user stations 624. In an embodiment, the user stations 624 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 624 are connected to the host computer 622 via a local area network ("LAN") 626. Other user stations 624 are remotely connected to the host computer 622 via a public telephone switched network ("PSTN") 628 and/or a wireless network 630.

In an embodiment, the host computer 622 operates in conjunction with a data storage system 631, wherein the data storage system 631 contains a database 632 that is readily accessible by the host computer 622.

In alternative embodiments, the database 632 may be resident on the host computer, stored, e.g., in the host computer's ROM, PROM, EPROM, or any other memory chip, and/or its hard disk. In yet alternative embodiments, the database 632 may be read by the host computer 622 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 622 can access two or more databases 632, stored in a variety of mediums, as previously discussed.

Figure 5:
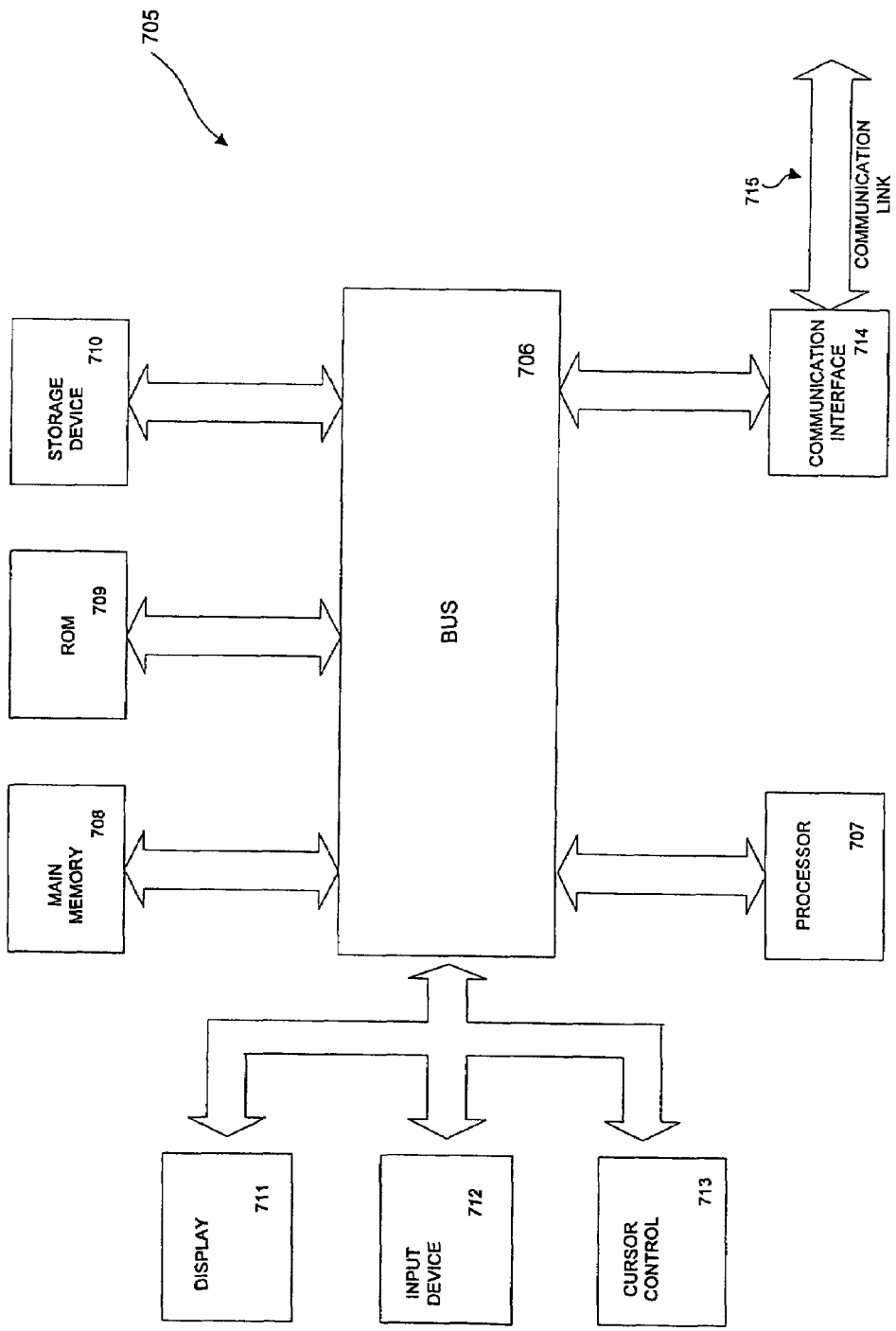
FIG. 5 is an additional diagram of computer hardware system with which the present invention can be implemented.

Referring to FIG. 5, in an embodiment, each user station 624 and the host computer 622, each referred to generally as a processing unit, embodies a general architecture 705. A processing unit includes a bus 706 or other communication mechanism for communicating instructions, messages and data, collectively, information, and one or more processors 707 coupled with the bus 706 for processing information. A processing unit also includes a main memory 708, such as a random access memory (RAM) or other dynamic storage device, coupled to the bus 706 for storing dynamic data and instructions to be executed by the processor(s) 707. The main memory 708 also may be used for storing temporary data, i.e., variables, or other intermediate information during execution of instructions by the processor(s) 707.

A processing unit may further include a read only memory (ROM) 709 or other static storage device coupled to the bus 706 for storing static data and instructions for the processor(s) 707. A storage device 710, such as a magnetic disk or optical disk, may also be provided and coupled to the bus 706 for storing data and instructions for the processor(s) 707.

A processing unit may be coupled via the bus 706 to a display device 711, such as, but not limited to, a cathode ray tube (CRT), for displaying information to a user. An input device 712, including alphanumeric and other keys, is coupled to the bus 706 for communicating information and command selections to the processor(s) 707. Another type of user input device may include a cursor control 713, such as, but not limited to, a mouse, a trackball, a fingerpad, or cursor direction keys, for communicating direction information and command selections to the processor(s) 707 and for controlling cursor movement on the display 711.

According to one embodiment of the invention, the individual processing units perform specific operations by their respective processor(s) 707 executing one or more sequences of one or more instructions contained in the main memory 708. Such instructions may be read into the main memory 708 from another computer-usable medium, such as the ROM 709 or the storage device 710. Execution of the sequences of instructions contained in the main memory 708 causes the processor(s) 707 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 707. Such a medium may take many forms, including, but not limited to, non-volatile, volatile and transmission media. Non-volatile media, i.e., media that can retain information in the absence of power, includes the ROM 709. Volatile media, i.e., media that can not retain information in the absence of power, includes the main memory 708. Transmission media includes coaxial cables, copper wire and fiber optics, including the wires that comprise the bus 706. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 707 can retrieve information.

Various forms of computer-usable media may be involved in providing one or more sequences of one or more instructions to the processor(s) 707 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 706 may receive the infrared signals and place the instructions therein on the bus 706. The bus 706 may carry the instructions to the main memory 708, from which the processor(s) 707 thereafter retrieves and executes the instructions. The instructions received by the main memory 708 may optionally be stored on the storage device 710, either before or after their execution by the processor(s) 707.

Each processing unit may also include a communication interface 714 coupled to the bus 706. The communication interface 714 provides two-way communication between the respective user stations 624 and the host computer 622. The communication interface 714 of a respective processing unit transmits and receives electrical, electromagnetic or optical signals that include data streams representing various types of information, including instructions, messages and data.

A communication link 715 links a respective user station 624 and a host computer 622. The communication link 715 may be a LAN 626, in which case the communication interface 714 may be a LAN card. Alternatively, the communication link 715 may be a PSTN 628, in which case the communication interface 714 may be an integrated services digital network (ISDN) card or a modem. Also, as a further alternative, the communication link 715 may be a wireless network 630.

A processing unit may transmit and receive messages, data, and instructions, including program, i.e., application, code, through its respective communication link 715 and communication interface 714. Received program code may be executed by the respective processor(s) 707 as it is received, and/or stored in the storage device 710, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A method of accessing database recovery logs of a database, said method comprising:
    selecting at least one of said database recovery logs to access, in which the at least one of the database recovery logs contains information for restoring the database to a specific state;
    establishing a view of the at least one of said database recovery logs;
    insulating said view from a format of the at least one of said database recovery logs;
    issuing a database statement to query said view;
    retrieving data from at least one of said database recovery logs in response to said database statement; and
    displaying a result of the act of retrieving the data or storing the result in a tangible computer readable medium.

2. The method of claim 1, wherein insulating said view comprises:
    generating a data dictionary snapshot; and
    translating said data using said data dictionary snapshot.

3. The method of claim 2, wherein said data is translated into an external data format.

4. The method of claim 1, wherein time and/or date boundaries are established for said recovery logs.

5. The method of claim 1, wherein said database statement is a SQL statement.

6. The method of claim 1, wherein said recovery logs comprise an undo log and/or a redo log.

7. The method of claim 1, wherein said view is a relational view comprising at least one row and at least one column.

8. The method of claim 1, wherein said view is formed from a plurality of said recovery logs.

9. The method of claim 1, wherein said view does not utilize database storage space.

10. The method of claim 1, wherein establishing a view comprises a virtual table using data from the at least one of said database recovery logs, wherein a format of said virtual table is independent of the format of the at least one of said database recovery logs.

11. The method of claim 1, wherein a format of the view remains unchanged without modifying a query statement corresponding to the view when the format of the at least one of said recovery logs changes.

12. A computer program product that includes a medium usable by a processor, said medium having stored thereon a sequence of instructions which, when executed by said processor, causes said processor to execute a process for accessing database recovery logs, said process comprising:
    selecting at least one of said database recovery logs to access, in which the at least one of the database recovery logs contains information for restoring the database to a specific state;
    establishing a view of the at least one of said database recovery logs;
    insulating said view from a format of the at least one of said database recovery logs;
    issuing a database statement to query said view;
    retrieving data from at least one of said database recovery logs in response to said database statement; and
    displaying a result of the act of retrieving the data or storing the result in a tangible computer readable medium.

13. The computer program product of claim 12, wherein insulating said view comprises:
    generating a data dictionary snapshot; and
    translating said data using said data dictionary snapshot.

14. The computer program product of claim 13, wherein said data is translated into an external data format.

15. The computer program product of claim 12, wherein time and/or date boundaries are established for said recovery logs.

16. The computer program product of claim 12, wherein said recovery logs comprise an undo log and/or a redo log.

17. The computer program product of claim 12, wherein said view is a relational view comprising at least one row and at least one column.

18. The computer program product of claim 12, wherein said view is formed from a plurality of said recovery logs.

19. The computer program product of claim 12, wherein said view does not utilize database storage space.

20. The computer program product of claim 12, wherein establishing a view comprises a virtual table using data from the at least one of said database recovery logs, wherein a format of said virtual table is independent of the format of the at least one of said database recovery logs.

21. The computer program product of claim 12, wherein a format of the view remains unchanged without modifying a query statement corresponding to the view when the format of the at least one of said recovery logs changes.

22. A system for accessing database recovery logs, said system comprising:
- means for selecting at least one of said database recovery logs to access:
- means for establishing a view of the at least one of said database recovery logs:
- means for insulating said view from a format of the at least one of said database recovery logs;
- means for issuing a database statement to query said view;
- means for retrieving data from at least one of said database recovery logs in response to said database statement; and
- a display apparatus configured for displaying a result of the act of retrieving the data or a computer readable medium or a storage device configured for storing the result.

23. The system of claim 22, wherein means for insulating said view comprises:
- means for generating a data dictionary snapshot: and
- means for translating said data using said data dictionary snapshot.

24. The system of claim 23, wherein said data is translated into an external data format.

25. The system of claim 22, wherein time and/or date boundaries are established for said recovery logs.

26. The system of claim 22, wherein said recovery logs comprise an undo log and/or a redo log.

27. The system of claim 22, wherein said view is a relational view comprising at least one row and at least one column.

28. The system of claim 22, wherein said view is formed from a plurality of said recovery logs.

29. The system of claim 22, wherein said view does not utilize database storage space.

30. The system of claim 22, wherein the view in the means for establishing a view comprises a virtual table using data from the at least one of said database recovery logs, wherein a format of said virtual table is independent of the format of the at least one of said database recovery logs.

31. The method of claim 1, wherein a format of the view remains unchanged without modifying a query statement corresponding to the view when the format of the at least one of said recovery logs changes.

* * * * *

UNITED STATES PATENT AND TRADEMARK OFFICE
CERTIFICATE OF CORRECTION

| | | |
|---|---|---|
| PATENT NO. | : 7,617,254 B2 | Page 1 of 1 |
| APPLICATION NO. | : 10/635708 | |
| DATED | : November 10, 2009 | |
| INVENTOR(S) | : Loaiza et al. | |

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 441 days.

Delete the phrase "441 days" and insert -- 932 days --.

On the Title page, item (56), in column 2, under "Other Publications", line 5, delete "WCB3/" and insert -- WCB/ --, therefor.

On page 2, in column 2, under "Other Publications", line 13, delete "User'S" and insert -- User's --, therefor.

In column 1, line 9, delete "Jan.3," and insert -- Jan. 3, --, therefor.

In column 5, line 51, delete "user-define" and insert -- user-defined --, therefor.

In column 15, line 51, after "$10,000" insert -- . --.

In column 23, line 15, in claim 22, delete "access:" and insert -- access; --, therefor.

In column 23, line 17, in claim 22, delete "logs:" and insert -- logs; --, therefor.

In column 24, line 1, in claim 23, delete "sanpshot:" and insert -- snapshot; --, therefor.

Signed and Sealed this

Third Day of August, 2010

David J. Kappos
*Director of the United States Patent and Trademark Office*